United States Patent [19]

Baron et al.

[11] Patent Number: 5,147,721
[45] Date of Patent: Sep. 15, 1992

[54] CERAMIC REINFORCED GLASS MATRIX

[75] Inventors: Kenneth S. Baron, San Ramon; Milton F. Custer, Byron; Andreas G. Hegedus, San Francisco, all of Calif.

[73] Assignee: Hexcel Corporation, Dublin, Calif.

[21] Appl. No.: 377,165

[22] Filed: Jul. 7, 1989

[51] Int. Cl.⁵ .............................................. B29B 11/16
[52] U.S. Cl. .................................. 428/365; 428/245; 428/289; 428/359; 428/377; 428/902; 57/243; 57/249; 57/204; 57/220; 57/221; 57/362
[58] Field of Search ............... 428/245, 359, 365, 289, 428/902, 377; 57/243, 249, 204, 220, 221, 362

[56] References Cited

U.S. PATENT DOCUMENTS

| | | | |
|---|---|---|---|
| 2,990,671 | 7/1961 | Bunting, Jr. et al. | 57/204 |
| 3,144,687 | 4/1965 | Skalko et al. | 57/249 |
| 3,367,095 | 2/1968 | Field, Jr. | 57/204 |
| 3,427,647 | 2/1969 | Field, Jr. | 57/204 |
| 3,650,810 | 3/1972 | Marzocchi | 57/249 |
| 4,099,370 | 7/1978 | Umiastowski | 57/204 |
| 4,159,618 | 7/1979 | Sokaris | 57/249 |
| 4,430,851 | 2/1984 | Sundet | 57/243 |
| 4,433,535 | 2/1984 | Darrichaid et al. | 57/249 |
| 4,650,775 | 3/1987 | Hill | 428/296 |
| 4,681,801 | 7/1987 | Eian et al. | 428/296 |
| 4,734,321 | 3/1988 | Radvan et al. | 428/296 |
| 4,741,873 | 5/1988 | Fischer et al. | 264/25 |
| 4,917,941 | 4/1990 | Hillig et al. | 428/296 |

FOREIGN PATENT DOCUMENTS 0043134  3/1984  Japan .

*Primary Examiner*—George F. Lesmes
*Assistant Examiner*—Beverly A. Pawlikowski
*Attorney, Agent, or Firm*—Oblon, Spivak, McClelland, Maier & Neustadt

[57] ABSTRACT

A glass matrix/ceramic fiber reinforcement composite is prepared from a yarn formed by spinning glass fiber and ceramic fibers lengths together, to form a bicomponent yarn. The yarn is weavable and spinnable, and accordingly may be prepared in fabric forms, or in windings, of predetermined shape. The precursor is melted by heating to the temperature of the melting point of glass, which fused the glass into a continuous matrix, surrounding the ceramic reinforcement.

13 Claims, No Drawings

CERAMIC REINFORCED GLASS MATRIX

FIELD OF THE INVENTION

This invention pertains to the field of reinforced glass matrix composites, particularly composites reinforced with discontinuous ceramic fiber material. This invention also pertains to a commingled yarn suitable for making the composite, a method of making the yarn, and a method of forming the composite itself.

BACKGROUND OF THE PRIOR ART

Reinforced glass matrix materials, i.e., glass matrix composites, are finding increasing use in the "intermediate" temperature range where composites enjoy advantages over alternatives, such as steel alloys and the like. In particular, aircraft operating at about mach 1, including both sub and supersonic speeds, frequently encounter temperatures in the *00-1500° F. range, exposing many structural items to potential heat damage. At temperatures substantially above this range, solid ceramic materials are used. Below this range, reinforced resin materials, typically organic resins such as epoxy thermoset and various thermoplastic resins are employed.

Prior art attempts to form composites for the intermediate temperature, employing a glass matrix reinforced by ceramic fiber systems, comprise the formation of a slurry containing glass frit, destined to become the matrix, a resinous binder material and a solvent for the binder. A ceramic fiber tow or tow system is impregnated with the slurry, the glass being held in place by the binder. This type of formation system is difficult to handle, and reduces the control of the final shape and composition of the matrix. In particular, a very significant amount of the binder is needed to hold the powder in place, yet the binder must be removed . prior to consolidation of the glass matrix, which presents a slow process, and a costly problem. If the binder is not removed, voids in the matrix can frequently occur, substantially weakening the composite. Alternatively, if the binder concentration is reduced, the glass powder may be lost during handling, again, defeating the object, which is to obtain a uniform matrix of glass material, with ceramic reinforcement distributed homogeneously therethrough.

The above prior art process presents other problems as well. In particular, it is quite difficult to achieve substantial variations in the matrix/ceramic ratio, and thus, difficult to adapt the ceramic reinforcement loading value to meet various applications. Additionally, uniformity, or homogeneity of the distribution of the reinforcement fiber is difficult to achieve according to these prior art systems. Problems encountered in impregnation and binder handling essentially prevent a thorough intermingling of the matrix and fiber materials. Additionally, it is quite difficult to provide parts of complex shape and structure, without complicated multi-part tools, etc., the precursors are neither easily transported, nor easily worked with.

Accordingly, it remains an object of the art to provide a method by which a uniform, high density glass matrix material, reinforced with non-continuous ceramic fibers. Such as process should result in a composite, or precursor, which is susceptible of easy transportation, shaping and the like.

SUMMARY OF THE INVENTION:

The above objectives, and others that will become clear in the specification set forth below, are achieved by providing a bicomponent, or commingled yarn, comprised of both glass and ceramic fibrous lengths. The relative loading amount corresponds to the relative concentration of ceramic staple lengths to glass staple lengths. Continuous glass fiber yarns are twisted with ceramic fibers, and the commingled yarns are pulled to their elongation maximum and broken, giving weavable lengths of glass/ceramic yarn. The fibers may be monofilament, or multifilament, although in general multifilament yarn is envisioned.

Lengths of glass and ceramic fibers are prepared. These are spun or twisted together, in twisting technology practiced by Heltra Corporation , and Schappe, of France. Another well known practitioner of the twisting/spinning is Cortauld of the U.K. (owner of Heltra). In essence, the continuous lengths are spun together, in much the same fashion that wool fibers, or cotton fibers are combined to present threads of the same. There are many minor variations on the twisting technology, and no importance is attached thereto. The process of twisting, per se, does not constitute an aspect of the invention.

The resulting yarn retains the handleability and tensile qualities of the glass, all simultaneously offering the reinforcement properties of ceramic fibers. Thus, even at a loading value of 30-50% ceramic, a loss of no more than about 15% of the handling properties of the glass fiber is experienced.

The resulting yarn can be handled just as if it were fiberglass yarn, that is, it may be woven, stitched together, wound on a form or otherwise combined to form a fabric, etc. The resulting precursor is drapable, handleable, and easily transported. It may consist entirely of the yarns, additional ceramic or glass fibers to alter the loading concentration, or other components whose presence in the ultimate composition is desired, such as continuous lengths of reinforcing material, at specific locations. the precursors may be combined, to provide a relatively thick fabric.

When placed in a mold, defining the ultimate shape of the composite, the precursor is heated to the melting temperature of the glass element of the bicomponent yarn. This temperature will vary depending on the particular glass used, but in general ranges from 425° C. to 1370° C. When cooled, the resulting composite exhibits very low void content, a significant improvement in density of the prior art. the ceramic lengths are present in the composite, in position generally corresponding to their presence in the precursor. Thus, improved homogeneity and randomness of the distribution of the ceramic fiber is achieved. Additionally, problems encountered in the prior art in attaining parallelity of ceramic reinforcing yarns are overcome.

DETAILED DESCRIPTION OF THE INVENTION:

To prepare the novel yarn of the claimed invention, glass matrix precursor fibers (i.e., glass comprising materials) or fiber lengths are combined by twisting with ceramic reinforcement fibers. In one method, continuous lengths of fiberglass are combined with continuous lengths of ceramic fiber, to provide a continuous commingled yarn. In a second embodiment, staple lengths (1½-3½ inch) of glass matrix precursor material are twisted together to form, and ceramic reinforcement fiber staples are similarly twisted to form fibers, and the fibers are twisted to form the commingled yarn of the invention. In both these embodiments, the ceramic reinforcement will be continuous when the matrix is formed.

In an alternative, mixed "linters" or staple lengths of glass matrix precursor fibers and ceramic reinforcement fibers are twisted together to form a continuous commingled yarn. This may allow superior control over weight ratios. In this embodiment, the ceramic reinforcement in the matrix formed by melting the glass component will be discontinuous. The ratio of fiberglass to ceramic fibers will determine the loading of the ceramic reinforcement in the ultimate composite. In general, depending on the ultimate embodiment, the ratio of glass to ceramic may range from 5:1–1:1, as determined by weight. Preferred ratios range from 2:1–4:1.

The bicomponent yarn may be prepared from unsized materials, or sized materials. As the twisting technology is entirely mechanical, the compatibility of the materials employed should govern the source of the materials. In general, it may be desirable to apply a surfactant to the glass fiber, or the bicomponent fiber, to achieve better wetting out of the ceramic reinforcement. This is optional, and occurs only where problems in securing a good bond between the fiber and the matrix are encountered, in the final product.

The bicomponent yarn may be incorporated in a woven fabric comprised entirely of bicomponent yarns, or knitted together, using a secondary, fugitive fiber, which disappears on firing. The fabric may, as noted above, include additional components, such as other reinforcements. Because the material is woven or formed into a fabric-type system prior to firing, or wound on a mandrel or form, the placement of the additional components can be Made quite precise.

To improve the handleability of the bicomponent fiber, it may be necessary to "serve" the bicomponent yarn, that is, put a light yarn around the bicomponent yarn. In general, a light weight. e.g., 20 d fugitive yarn, of, e.g., rayon, may be wrapped around the yarn, either loosely, or as a complete covering, depending on the handling requirements, to improve the bicomponent yarns handleability. This may be particularly necessary where complex weaving or knitting operations are contemplated.

It should be noted that, due to the retention of the glass fiber characteristics in the bicomponent yarn, these yarns lend themselves to automated fabric manufacturing processes, typically employed in the manufacture of reinforcement fabrics or "prepregs" for fiber reinforced resin matrix components. In point of fact, the precursor prepared from the yarn of this invention can be treated exactly as if it were a dry fabric. Alternatively, conventional winding techniques, generally referred to as filament winding, may be employed.

In one preferred embodiment, a honeycomb ceramic-reinforced glass matrix composite is prepared. A fabric, essentially comprised of the bicomponent yarn described above, is prepared. This fabric is expanded or corrugated to approximate the honeycomb shape, according to standard processes. A skin, of alternate material, resistant to temperatures up to and including the melt point of the matrix glass, may be applied, if necessary. One example would include an aluminum film or sheet. The resultant honeycomb is fired, in a suitable chamber, to the melting point of the glass material in the bicomponent yarn. Upon cooling, a uniform, reinforced glass matrix composite, of the desired shape, is obtained without significant post-fabrication machining, to reach the desired shape and size.

Virtually any glass material may be employed as the fiberglass fiber, and any ceramic fiber employed as the ceramic element. Glass materials that are preferred include glass fibers that melt at lower temperatures, for the obvious purpose of energy conservation. Fibers of materials such as E-glass or S-glass are preferred. Use of a Lower melting glass allows the incorporation of a wider variety of additional components, which might be resistant to the lower temperatures, but not higher temperatures at which other glass compositions are known to melt. Similarly, any ceramic fiber may be used, as the decomposition temperature of such a fiber exceeds the melt point of the glass component. Suitable examples, without limitation, include NEXTEL 480 or ASTROQUARTZ.

A particularly preferred embodiment involves the use of a glass-ceramic fiber in place of glass fiber. Such fibers such as those set forth in U.S. Pat. No. 4,199,336 are drawn from vitreous melts, which can be converted to a crystalline phase by heating. In the process of the invention, these fibers are processed identically to the glass fibers as set forth above. After melting, the composite would be annealed, converting the glass matrix to a crystalline matrix of high mechanical properties and thermal stability.

Specific examples conducted to prepare actual reinforced composites include the combination of S-glass and E-glass fibers with fiber of similar size drawn from NEXTEL 480 and ASTROQUARTZ fibers. Four different combinations (S-glass with both types of ceramic fiber and E-glass with both types of ceramic fiber) were mixed in ratios ranging from about 2:1–4:1 glass-ceramic. The fabrics prepared from the yarns obtained were heated in air, to a temperature of 1000° C. for one hour, and subsequently cooled. The glass component of the bicomponent yarn had fused, to form a continuous matrix around the reinforcing non-continuous filaments of ceramics provided by the initial yarn.

Obviously, numerous modifications and variations of the present invention are possible in light of the above teachings. In particular, it should be noted that various glass materials and ceramic materials, of varying lengths can be used, depending upon the ultimate result. Similarly, temperature and loading values or component ratios will be altered, according to the application envisioned. it is therefore to be understood that within the scope of the appended claims, the invention may be practiced otherwise than as specifically described herein.

What is claimed is:

1. A yarn which may be incorporated in a fabric or filament wound, comprising commingled staple length strands of class matrix precursor fiber and ceramic reinforcement fiber, said yarn being prepared by twisting a mixture of said fibers together in a ratio of 1:1–5:1, glass matrix precursor to ceramic reinforcement, to provide a yarn wherein the two components are present in said ratio.

2. The yarn of claim 1 wherein said yarn is served with an outer layer of a light weight thread which is destroyed at a temperature no greater than the melting point of the glass components.

3. The yarn of claim 1, wherein said glass matrix precursor fiber has a melting point less than that of the reinforcement fiber.

4. The yarn of claim 3, wherein said glass matrix precursor fiber is comprised of S-glass or E-glass.

5. The yarn of claim 1, wherein said glass matrix precursor fiber material is selected from the group consisting of S-glass, E-glass, glass-ceramic material and mixtures thereof.

6. A fabric comprised of the yarns of claim 1, which fabric is handleable and drapable, and formable to a predetermined shape, and subsequently heated to a point above the melting temperature of the glass matrix precursor fiber to form a glass matrix reinforced with lengths of ceramic fiber.

7. The fabric of claim 6, wherein said fabric comprises at least one additional component resistant to temperatures equal to the melting point of the glass component of said yarn.

8. A fabric according to claim 6, further comprising a surfactant selected to modify the wettability of the surface of said ceramic component of said yarn.

9. The fabric of claim 6, wherein said fabric is woven.

10. The fabric of claim 6, wherein said fabric is Nonwoven.

11. A glass matrix/ceramic fiber reinforced composite of high density and low void percentage, comprised of a glass matrix with discontinuous staple length strands of ceramic fiber randomly and homogeneously distributed therethrough, prepared from the process comprising
    (1) preparing a yarn of claim 1,
    (2) incorporating said yarn in a fabric, and
    (3) heating said fabric to a temperature above the melting point of the glass component of said yarn, to fuse said yarn, and thereby form a continuous matrix around the ceramic component of said yarn.

12. The composite of claim 11, wherein said composite contains a third element, incorporated in said fabric.

13. A glass/ceramic composite, comprised of a glass matrix with ceramic fibers distributed homogeneously therethrough, prepared by the process comprising:
    (1) preparing at least one yarn of claim 1
    (2) winding said yarn about a form of predetermined shape, and
    (3) heating said wound yarn to a temperature above the melting point of the glass component of said ceramic, to thereby form said composite, with a shape corresponding to said predetermined form.

* * * * *